UNITED STATES PATENT OFFICE.

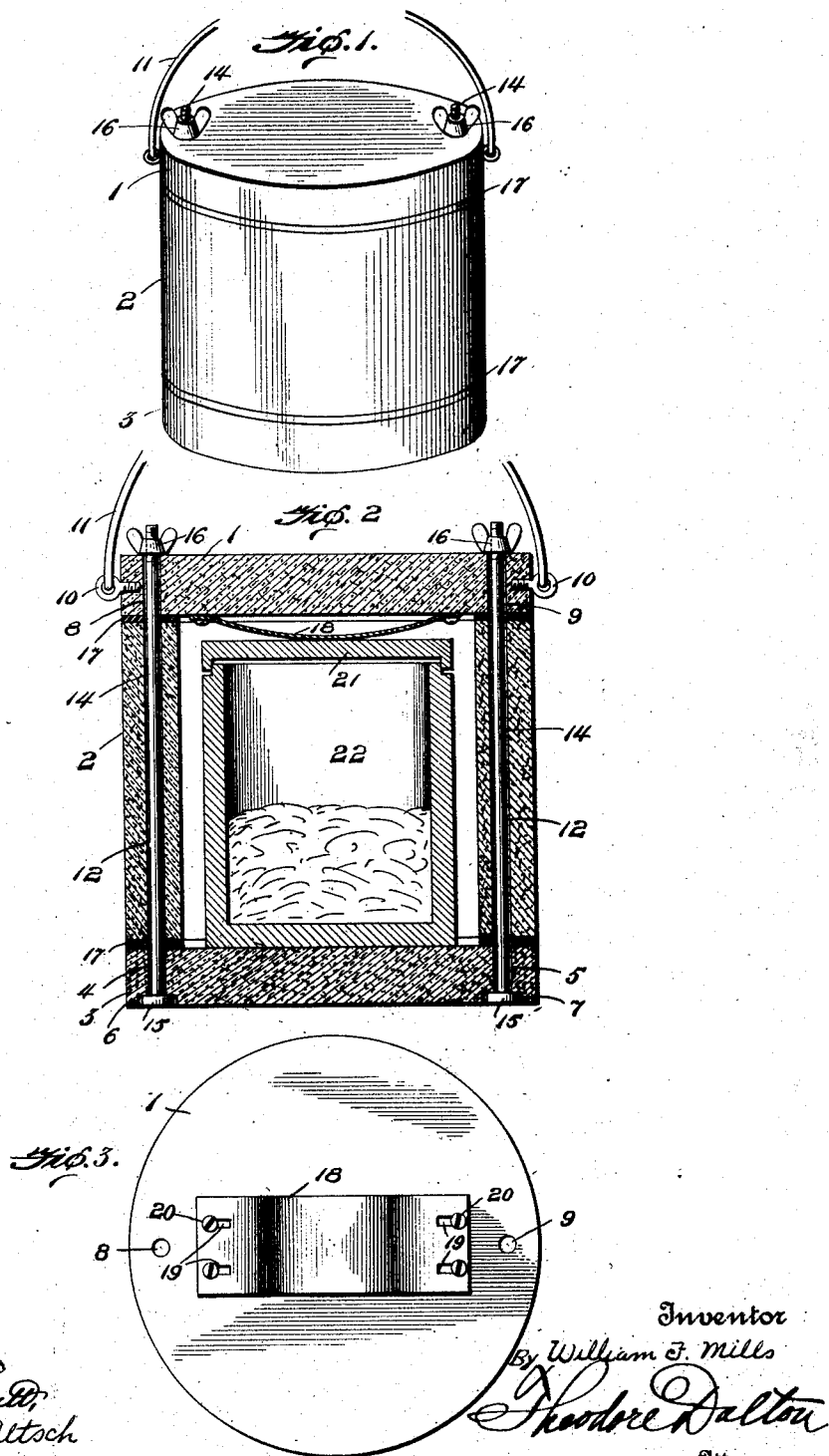

WILLIAM F. MILLS, OF SOUTH BEND, INDIANA.

COOKING APPARATUS.

No. 851,018.  Specification of Letters Patent.  Patented April 23, 1907.

Application filed September 30, 1905. Serial No. 280,812.

*To all whom it may concern:*

Be it known that I, WILLIAM F. MILLS, a citizen of the United States, residing at South Bend, in the county of St. Joseph and State of Indiana, have invented new and useful Improvements in Cooking Apparatus, of which the following is a specification.

This invention relates to that class of cookers in which the food is cooked by retention of the heat therein; and the same primarily consists of a sectional knockdown receptacle, of a heat-non-conducting material, in which a cooking vessel containing partly cooked or heated food is placed and sealed.

The invention further consists in providing means for locking the sections or parts together so as to effect a perfect seal between the joints thereof and also prevent their displacement and at the same time permitting the parts to be dismembered and easily and thoroughly cleaned.

Further, the invention consists in means whereby the cover of the cooking vessel or jar will be hermetically sealed when the parts of the cooker are assembled, thus preventing the escape of steam and heat.

In the drawings accompanying this specification, Figure 1 is a perspective view of the cooker complete. Fig. 2 is a central vertical section thereof, and Fig. 3 is an inverted plan view of the upper member of the cooker.

In carrying out the invention I construct the parts of the cooker of any suitable material that is a bad conductor of heat, such as wood or a composition of compressed sawdust, preferably the latter, as I have found that it may be compounded so as to be practically non-absorbent, which is a desideratum in preserving the sanitary condition of the cooker.

The cooker includes three members or parts, the top and bottom members being in the form of disks, (designated 1 and 3.) The bottom member 3 has transverse openings 4 and 5 arranged at diametrically opposite points and provided with countersunk portions 6 and 7, the purposes of which will appear hereinafter. The upper member 1 has similar openings 8 and 9 and also ears 10 10 for engagement with a bail 11, so that the cooker may be readily carried from place to place. The intermediate member 2 is in the form of a hollow cylinder open at the top and bottom and provided with longitudinal diametrically-arranged opening 12 12, adapted when the parts are assembled to aline with the openings in the top and bottom members, so as to provide two straight continuous vertical channels through the cooker.

14 designates tie-rods each of which is provided with a head 15 on one end and a thread on its other end. These tie-rods are let into the openings in the top, bottom, and intermediate members with their heads in the countersinks of the bottom members, and when a thumb-nut 16 is screwed on the threaded ends the members are bound tightly together and also held against lateral movement.

Between the contiguous faces of the members are interposed suitable packings 17, preferably rubber gaskets. These gaskets are compressed when the nuts 16 are screwed down, and a tight seal is effected between the joints.

On the bottom of the top member 1 is a bowed spring 18, the ends of which are slotted, as at 19, so as to permit it to yield slightly and slide on its fastening-pins 20 when pressed into contact with the lid or cover 21 of a cooking vessel or pot 22, whereby pots of different heights will be sealed against the escape of heat.

In use the food is partly cooked on a stove, and the vessel 22 is then positioned upon the bottom member 3, which has the rods 14 therein. The member 2 is then slipped over the pots and on to the rods. The upper member is put on and the nuts 16 applied, forcing the spring 18 against the pot-cover and sealing both receptacles. The food in the inner vessel will now continue to cook, inasmuch as the heat is retained therein.

It will be seen that the parts may be easily dismembered and cleaned and shipped and stored in compact form.

Having thus described my invention, what I claim, and desire to secure by Letters Patent, is—

A cooker of the class described embodying top and bottom disk members and an intermediate, hollow member engaging the disks near the edges thereof and forming therewith a cylindrical receptacle, said disks and said hollow member having alining openings, tie-rods disposed in the said openings and having heads countersunk in the bottom disk, thumb-nuts on the ends of the rods and engaging the top disk, packing between the contiguous faces of the disks and hollow member, and a bowed spring on the bottom of the top disk adapted to engage the cover of a cooking vessel within the cooker, substantially as specified.

In testimony whereof I affix my signature in presence of two subscribing witnesses.

WILLIAM F. MILLS.

Witnesses:
 GEORGE OLTSCH,
 ETHEL MIKELS.